US011203318B2

(12) United States Patent
McCool

(10) Patent No.: US 11,203,318 B2
(45) Date of Patent: Dec. 21, 2021

(54) AIRBAG EXTENSION SYSTEM

(71) Applicant: Waymo LLC, Mountain View, CA (US)

(72) Inventor: Courtney McCool, San Jose, CA (US)

(73) Assignee: Waymo LLC, Mountain View, CA (US)

( * ) Notice: Subject to any disclaimer, the term of this patent is extended or adjusted under 35 U.S.C. 154(b) by 294 days.

(21) Appl. No.: 16/010,852

(22) Filed: Jun. 18, 2018

(65) Prior Publication Data

US 2019/0381965 A1  Dec. 19, 2019

(51) Int. Cl.
| | |
|---|---|
| *B60R 21/20* | (2011.01) |
| *B60R 21/264* | (2006.01) |
| *B60R 21/0134* | (2006.01) |
| *B60R 21/015* | (2006.01) |
| B60R 21/01 | (2006.01) |
| B60R 21/02 | (2006.01) |

(52) U.S. Cl.
CPC .......... *B60R 21/20* (2013.01); *B60R 21/0134* (2013.01); *B60R 21/01512* (2014.10); *B60R 21/01554* (2014.10); *B60R 21/264* (2013.01); *B60R 2021/01286* (2013.01); *B60R 2021/0273* (2013.01)

(58) Field of Classification Search
CPC ................................ B60R 19/40; B60R 21/20
See application file for complete search history.

(56) References Cited

U.S. PATENT DOCUMENTS

| | | | | |
|---|---|---|---|---|
| 2,806,737 | A | * 9/1957 | Maxwell | B60R 21/232 280/734 |
| 4,518,183 | A | * 5/1985 | Lee | B60R 19/40 180/271 |
| 5,135,253 | A | * 8/1992 | Hirashima | B60R 21/2155 280/732 |
| 5,377,108 | A | 12/1994 | Nishio | |
| 5,413,378 | A | 5/1995 | Steffens, Jr. et al. | |
| 5,430,649 | A | 7/1995 | Cashier et al. | |
| 5,446,661 | A | 8/1995 | Gioutsos et al. | |

(Continued)

FOREIGN PATENT DOCUMENTS

| | | | | |
|---|---|---|---|---|
| CN | 210062909 U | * 2/2020 | ............. | B60R 19/18 |
| DE | 19860823 A1 | 7/2000 | | |

(Continued)

OTHER PUBLICATIONS

Predictive Mover Detection and Tracking in Cluttered Environments, 9 pgs. (2006).

(Continued)

*Primary Examiner* — Faye M Fleming
(74) *Attorney, Agent, or Firm* — Botos Churchill IP Law

(57) ABSTRACT

Aspects of the disclosure relate to reducing the likelihood of injury to a passenger in a collision. In one example, a computing device may determine that an impact between a vehicle and an object external to the vehicle is imminent. The computing device may determine a protection range for a vehicle's airbag based on characteristics of the passenger, including the passenger's seating location within the vehicle. An airbag extension system may position an airbag package, including the vehicle's airbag, such that the vehicle's airbag is within the protection range of the passenger's seating location.

19 Claims, 13 Drawing Sheets

(56) References Cited

U.S. PATENT DOCUMENTS

| | | | |
|---|---|---|---|
| 5,810,427 A * | 9/1998 | Hartmann | B60R 19/40 |
| | | | 280/742 |
| 5,899,946 A | 5/1999 | Iyoda | |
| 5,959,552 A | 9/1999 | Cho | |
| 6,076,854 A | 6/2000 | Schenck et al. | |
| 6,085,151 A | 7/2000 | Farmer et al. | |
| 6,106,038 A | 8/2000 | Dreher | |
| 6,139,052 A | 10/2000 | Preamprasitchai | |
| 6,188,940 B1 | 2/2001 | Blackburn et al. | |
| 6,394,490 B2 | 5/2002 | Osmer et al. | |
| 6,439,330 B1 | 8/2002 | Paye | |
| 6,470,272 B2 | 10/2002 | Cong et al. | |
| 6,523,872 B2 * | 2/2003 | Breed | B60R 19/00 |
| | | | 188/377 |
| 6,650,983 B1 | 11/2003 | Rao et al. | |
| 6,702,320 B1 | 3/2004 | Lang et al. | |
| 6,749,218 B2 | 6/2004 | Breed | |
| 6,755,453 B2 | 6/2004 | Kellas | |
| 6,775,605 B2 | 8/2004 | Rao et al. | |
| 6,776,436 B2 | 8/2004 | Takagi et al. | |
| 6,819,991 B2 | 11/2004 | Rao et al. | |
| 6,831,572 B2 | 12/2004 | Strumolo et al. | |
| 6,836,714 B1 | 12/2004 | Nitschke et al. | |
| 6,851,504 B2 | 2/2005 | Campbell et al. | |
| 6,917,305 B2 | 7/2005 | King | |
| 7,009,500 B2 | 3/2006 | Rao et al. | |
| 7,048,086 B2 | 5/2006 | Yoneda | |
| 7,050,606 B2 | 5/2006 | Paul et al. | |
| 7,174,985 B2 | 2/2007 | Sawa et al. | |
| 7,344,153 B1 | 3/2008 | Manneh et al. | |
| 7,350,804 B2 | 4/2008 | Bakhsh et al. | |
| 7,495,550 B2 | 2/2009 | Huang et al. | |
| 7,506,716 B1 | 3/2009 | Salmon et al. | |
| 7,513,524 B2 | 4/2009 | Oota et al. | |
| 7,616,101 B2 | 11/2009 | Kuttenberger et al. | |
| 7,630,806 B2 | 12/2009 | Breed | |
| 7,660,438 B2 | 2/2010 | Camus | |
| 7,797,108 B2 | 9/2010 | Grimm | |
| 7,874,576 B2 * | 1/2011 | Gandhi | B60R 21/203 |
| | | | 280/728.2 |
| 7,905,515 B2 * | 3/2011 | Heurlin | B60R 21/0134 |
| | | | 280/735 |
| 8,041,483 B2 | 10/2011 | Breed | |
| 8,128,122 B2 * | 3/2012 | Fukawatase | B60R 21/203 |
| | | | 280/730.1 |
| 8,444,178 B2 * | 5/2013 | Fong | B60R 21/01 |
| | | | 280/732 |
| 8,447,472 B2 | 5/2013 | Joh et al. | |
| 8,463,500 B2 | 6/2013 | Cuddihy et al. | |
| 8,474,865 B2 | 7/2013 | Grindle | |
| 8,554,461 B2 | 10/2013 | Cuddihy et al. | |
| 8,594,919 B2 | 11/2013 | Munakata | |
| 8,655,537 B2 | 2/2014 | Ferguson et al. | |
| 8,700,257 B2 | 4/2014 | Tamura et al. | |
| 8,801,035 B2 | 8/2014 | Kim et al. | |
| 8,807,595 B2 | 8/2014 | Nakamura et al. | |
| 8,814,202 B2 | 8/2014 | Matsushita et al. | |
| 8,947,532 B2 | 2/2015 | Augst | |
| 9,061,638 B2 | 6/2015 | Sievers et al. | |
| 9,487,177 B2 * | 11/2016 | Schneider | B60R 21/231 |
| 9,517,767 B1 | 12/2016 | Kentley et al. | |
| 9,586,555 B2 * | 3/2017 | Revankar | B60R 21/0136 |
| 9,630,619 B1 | 4/2017 | Kentley et al. | |
| 9,817,397 B1 | 11/2017 | Lamer et al. | |
| 9,849,852 B1 | 12/2017 | Lamer et al. | |
| 10,029,638 B1 * | 7/2018 | Lombrozo | B60R 21/0134 |
| 10,632,952 B2 * | 4/2020 | Markusic | B60R 21/231 |
| 2002/0059848 A1 * | 5/2002 | Adomeit | B62D 1/195 |
| | | | 74/498 |
| 2003/0155750 A1 | 8/2003 | Hu et al. | |
| 2004/0069555 A1 | 4/2004 | Yoneda | |
| 2004/0102984 A1 | 5/2004 | Wahlbin et al. | |
| 2005/0151393 A1 | 7/2005 | Borg et al. | |
| 2006/0031015 A1 | 2/2006 | Paradie | |
| 2006/0255573 A1 | 11/2006 | Tobata et al. | |
| 2006/0278461 A1 | 12/2006 | Shen et al. | |
| 2006/0282218 A1 | 12/2006 | Urai et al. | |
| 2008/0243342 A1 | 10/2008 | Breed | |
| 2009/0010495 A1 | 1/2009 | Schamp et al. | |
| 2009/0248253 A1 | 10/2009 | Le et al. | |
| 2009/0326766 A1 | 12/2009 | Wang | |
| 2010/0230944 A1 | 9/2010 | Narita et al. | |
| 2012/0256402 A1 | 10/2012 | Kato et al. | |
| 2013/0035827 A1 | 2/2013 | Breed | |
| 2015/0000994 A1 | 1/2015 | McLundie | |
| 2015/0177007 A1 | 6/2015 | Su et al. | |
| 2015/0274107 A1 | 10/2015 | Le et al. | |
| 2015/0330473 A1 | 11/2015 | Lombrozo et al. | |
| 2015/0336524 A1 | 11/2015 | Lamer et al. | |
| 2016/0059823 A1 | 3/2016 | Jayasuriya et al. | |
| 2017/0120902 A1 | 5/2017 | Kentley et al. | |
| 2017/0120904 A1 | 5/2017 | Kentley et al. | |
| 2019/0225171 A1 * | 7/2019 | Temple | B60R 19/40 |

FOREIGN PATENT DOCUMENTS

| | | | | |
|---|---|---|---|---|
| DE | 10036759 A1 * | 2/2002 | | B60R 21/261 |
| DE | 102010019592 A1 | 11/2011 | | |
| WO | 08069704 A1 | 6/2008 | | |

OTHER PUBLICATIONS

Airbag, Wikipedia, [Retrieved from the Internet Jun. 25, 2015, 21 pgs.; https://en.wikipedia.org/?title=Airbag].

Autoliv, "Pedestrian Protection", https://www.autoliv.com/products/passive-safety/pedestrian-protection, downloaded Mar. 13, 2018, 3 pages.

* cited by examiner

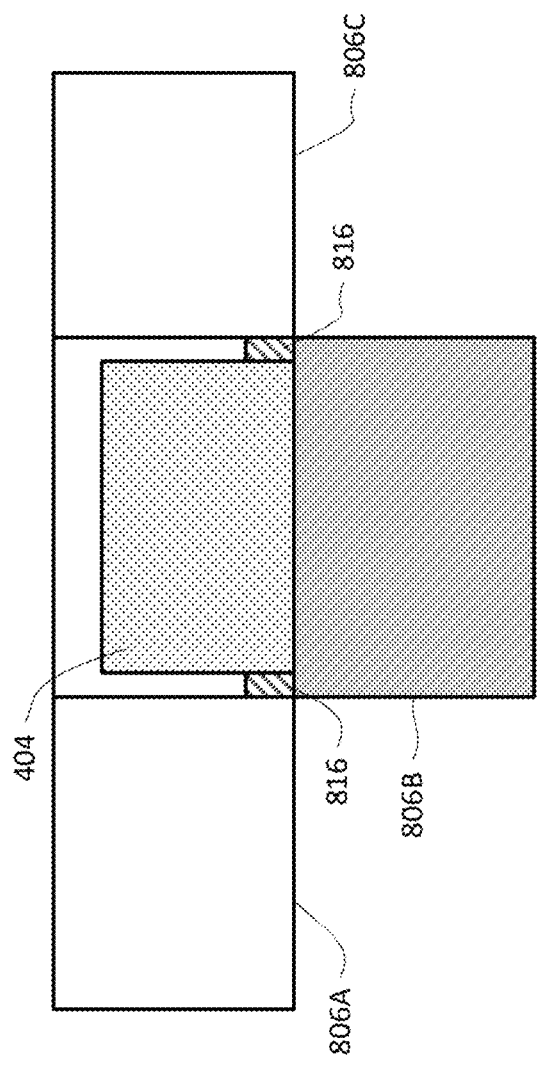
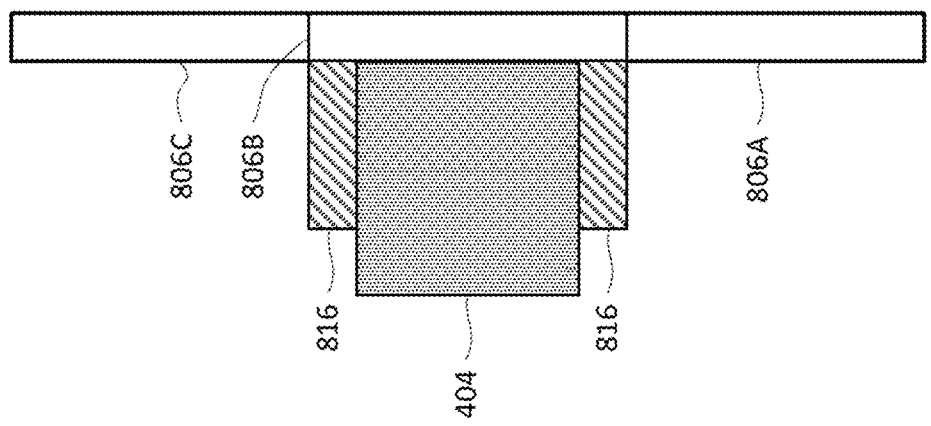
FIGURE 8B
FIGURE 8A

AIRBAG EXTENSION SYSTEM

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pick up or destination location, and the vehicle maneuvers itself to that location.

An important component of an autonomous vehicle is the perception system, which allows the vehicle to perceive and interpret its surroundings using cameras, radar, sensors, and other similar devices. Data from the perception system is then used by the autonomous vehicle's computer to make numerous decisions while the autonomous vehicle is in motion, such as decide when to speed up, slow down, stop, turn, etc. These decisions are used to maneuver between locations but also to interact with and avoid collisions with other objects along the way.

When a collision actually occurs, non-autonomous and autonomous vehicles alike may include various safety mechanisms to reduce injury to passengers. Typically, the safety mechanisms may include airbag systems employed to protect passengers from impacts within the interior of a vehicle after an impact with another vehicle or object external to the vehicle.

BRIEF SUMMARY

This technology generally relates to reducing the likelihood of injury to a passenger in a collision. One aspect of the technology is a system comprising a positioning unit and an airbag package, wherein the airbag package includes one or more airbags and one or more inflators. The airbag package is attached to the positioning unit and the positioning unit is configured to position the airbag package such that the one or more airbags are within a protection range of the passenger upon the one or more airbags being deployed by the one or more inflators.

In some instances, the protection range of the passenger is between 5 inches and 30 inches.

In some embodiments, the positioning unit is mounted to a frame of a vehicle. In some instances, the positioning unit is configured to rotate and translate the airbag package. In some embodiments, the positioning unit includes one or more linear actuators and the linear actuators position the airbag package.

In some instances, the positioning unit includes one or more telescoping rails, wherein each of the one or more telescoping rails includes two or more stages and the one or more telescoping rails are configured to position the airbag package within the protection range. In some embodiments, at least one of the one or more telescoping rails includes an expandable lock for securing the at least one of the one or more telescoping rails upon positioning the airbag package within the protection range upon at least one of the two or more stages of the telescoping rails expanding. In some instances, the one or more telescoping rails are configured to be extended by one or more of springs, actuators, or compressed gas.

In some embodiments, the positioning unit includes one or more hinges and the hinges are configured to rotate the airbag package into the protection range.

In some embodiments, the positioning unit includes one or more pyrotechnic lifters and the pyrotechnic lifters are configured to position the airbag package into the protection range. In some instances the pyrotechnic lifters include one or more extension rods connected to the airbag package.

In some embodiments, the airbag package is positioned behind a panel of a vehicle. In some instances, upon initiating positioning of the airbag package, the panel of the vehicle is opened.

In some embodiments, the inflator is a gas generator propellant.

Another aspect of the technology is directed to method comprising: determining, by one or more computing devices, that an impact between a vehicle and an object external to the vehicle is imminent; determining, by the one or more computing devices, a protection range for a vehicle's airbag based on characteristics of the passenger, including the passenger's seating location within the vehicle; and positioning, by an airbag extension system, an airbag package, including the vehicle's airbag, such that the vehicle's airbag is within the protection range of the passenger's seating location.

In some instances, the airbag extension system includes a positioning unit, wherein the positioning unit positions the airbag package.

In some embodiments, the positioning unit includes telescoping tubes, pyrotechnic lifters, hinges, or actuators. In some embodiments positioning the airbag package includes rotating and translationally moving the airbag package.

In some embodiments, the characteristics further include the passenger's size.

In some embodiments, the one or more computing devices trigger the positioning.

BRIEF DESCRIPTION OF THE DRAWINGS

FIGS. 8A and 8B are examples of an airbag extension system having mounted behind a panel of a vehicle in accordance with aspects of the disclosure.

DETAILED DESCRIPTION

Overview

This technology relates to an airbag extension system for bringing an airbag closer to a passenger. Typical vehicle airbags are generally standardized such that each airbag provides impact protection for a passenger of the vehicle located within a protection range of the airbag. In instances where a passenger is positioned outside of the protection range of a standardized airbag, these standardized airbags may not be sufficient to effectively protect passengers in the event of a collision and may increase the risk of injury to the passenger. This problem is particularly apparent in vehicles having a non-standard seating configuration where the front passenger's seat and/or driver's side seat are positioned further away from the vehicle's dash than a typical vehicle.

Figure 1:
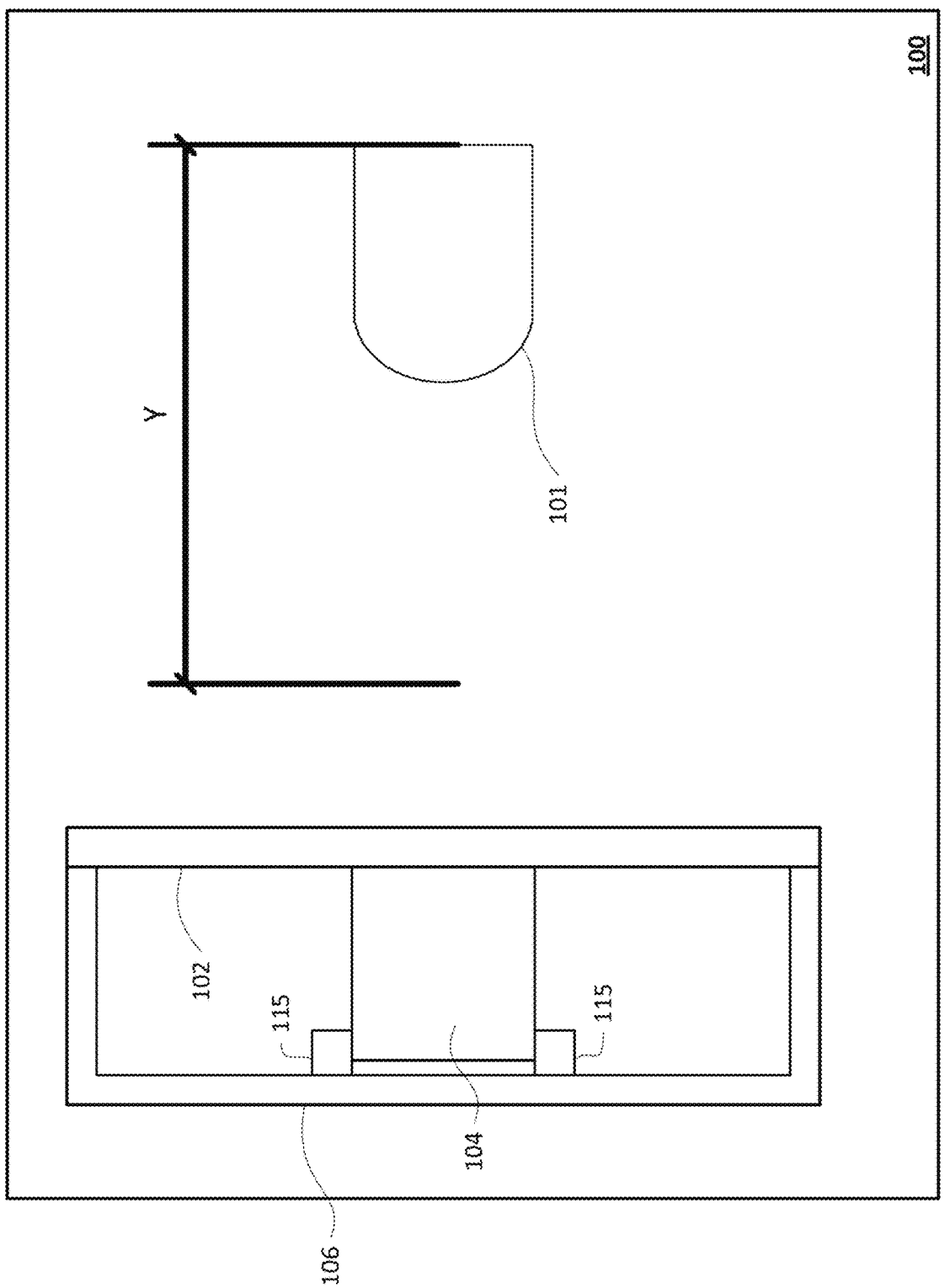
FIGS. 1 and 2 are top-down views of a vehicle equipped with a standard airbag system in accordance with aspects of the disclosure.
Figure 2:
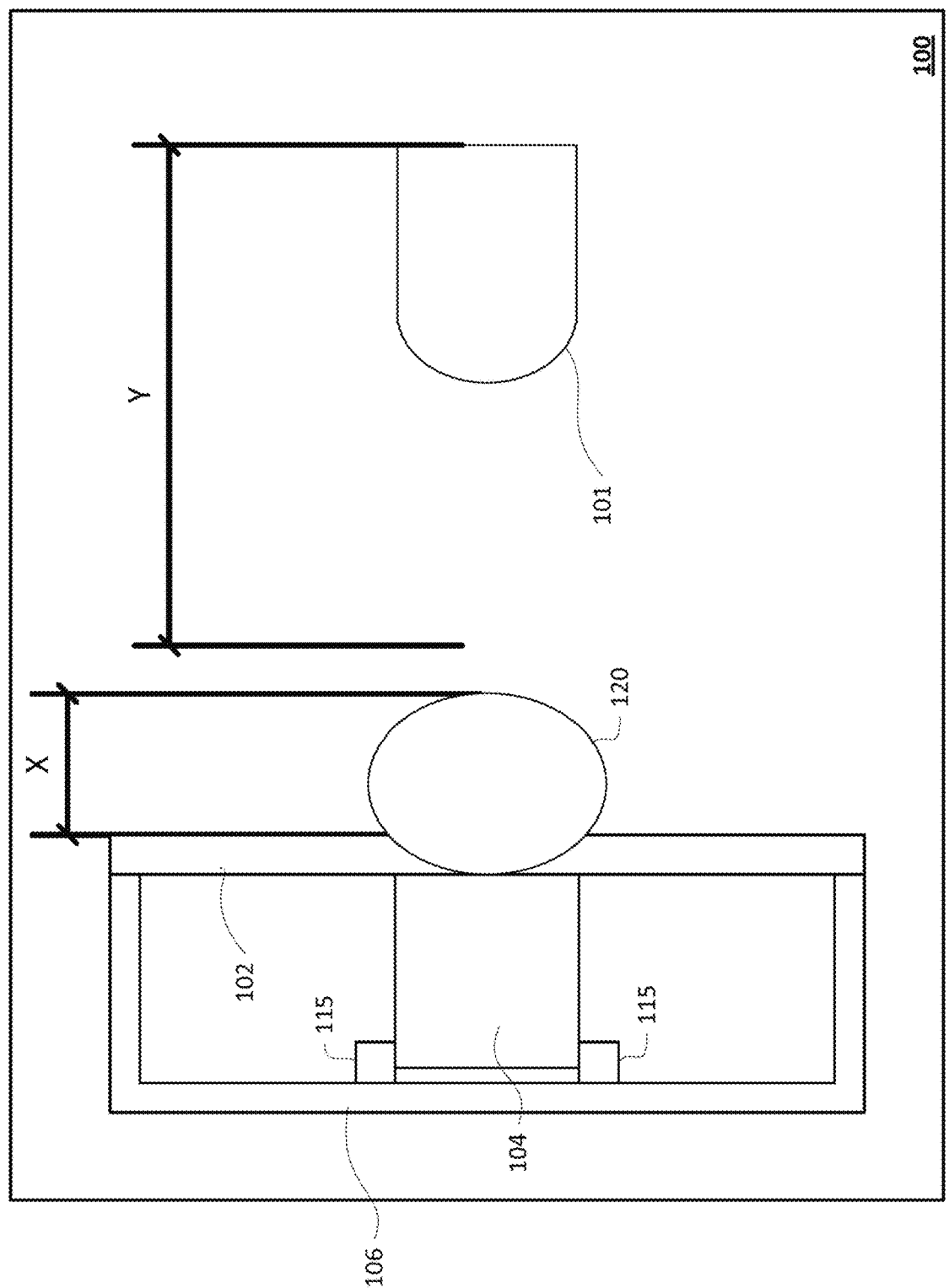

For instance, FIGS. 1 and 2 show a vehicle 100 having a standard airbag system 104 mounted to the frame of the vehicle 106 via mounts 115. The vehicle 100 has a front passenger seat 101 in a non-standard (i.e., untraditional) position, such that the seat 101 is positioned further away from the dashboard 102 than in a standard configuration. As such, the protection range of a passenger in seat 101, as illustrated by the distance "Y", is outside of the protection range "X" of the deployed standard airbag 120 of the airbag system 104, as illustrated by distance "X". Accordingly, the standard airbag 120 is not capable of providing protection to a passenger seated within seat 101.

Figure 3:
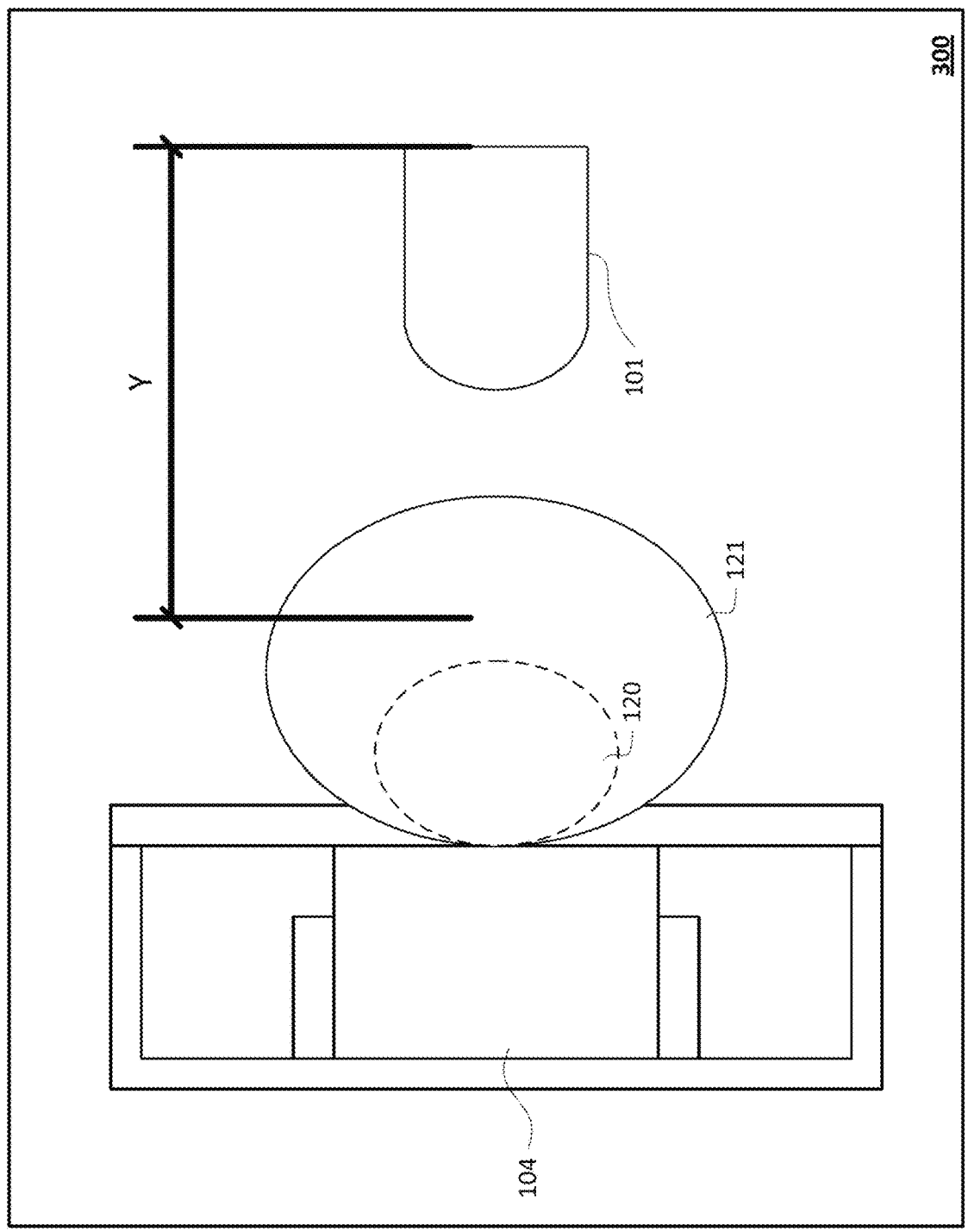
FIG. 3 is a top-down view of a vehicle having an airbag system with a larger airbag in comparison with a standard airbag in accordance with aspects of the disclosure.

In some instances, larger airbags may be used to provide protection for passengers positioned outside the protection range of a standardized airbag. For instance, as shown in FIG. 3, a vehicle 300, which may be compared to vehicle 100, may include a larger airbag 121 than the standard airbag 120. The larger airbag, when deployed, may provide protection within the protection range "Y" of seat 101. However, the increased size of the airbags may result in the need for multiple inflators, larger inflators, and/or custom inflators to provide adequate fluid to inflate the larger airbags. As such, manufacturing costs for the airbags is increased, as is the size of the airbag packages, making such airbags difficult to position within the vehicle. Moreover, larger airbags typically have longer seams where the material of the airbag is joined together, as well as a larger surface area than a standard size airbag. These seams, as well as the material itself, can leak fluid and cause rapid heat exchange, which may drop the internal fluid temperature, which in turn reduces the pressure within the airbag. As such, it may be difficult to inflate a very large bag in a specified amount of time, and because the volumes of larger airbags are also greater, it may be difficult to maintain target pressure. Many of these issues may be solved by sealing the seams and coating the airbag material, but these solutions further increase manufacturing cost and the size of the airbag package.

Larger airbags may also not be capable of providing proper protection for passengers positioned within the protection range of a standardized airbag, and in some instances, may injure passengers within the protection range. For instance, due to the increased size of the airbag the time to inflate the larger volume of a larger airbag may not fully inflate by the time passengers within the protection range contact the airbag. While a more powerful inflator may be used to inflate the larger airbag in a timely manner, once again, the additional size and cost of the more powerful inflator may be prohibitive. However, when a passenger impacts an inflated, larger airbag, the additional volume of fluid (as compared to a smaller air bag) within the airbag may not be easily displaced, resulting in the passenger absorbing high impact forces.

An airbag extension system may be used to adjust the position of a standard airbag in a position such that it protects passengers seated in a non-standard seating configuration. In this regard, the airbag extension system my include components which, prior to, or upon a collision occurring, move a standard airbag into the protection range of a passenger in a non-standard seating position. Upon being brought into the protection range of the passenger, the standard airbag may be deployed.

The airbag extension system may include a positioning unit for positioning the standard airbag in the protection range of a passenger. In this regard, the positioning unit may be any device capable of quickly moving the airbag package. For example, the positioning unit may include electromechanical linear actuators, telescoping rails, hinges, lifters, or other such devices.

The airbag extension system may be configured to rotate the airbag such that it deploys in the direction of the passenger. In this regard, the airbag package may be rotated as well as translated during deployment. As such, the airbag extension system may be positioned in a location other than directly in front of the passenger, as with a typical airbag, while still being capable of affording protection to a passenger in many different directions.

The deployment and positioning of the airbag by the airbag extension system may be controlled by one or more computing devices. In this regard, the computing device may monitor data captured from imaging sensors to determine that an impact with an object is imminent. Upon determining that an impact is imminent, the computing device may trigger deployment of the airbag extension system. Upon positioning the airbag package, the airbag extension system may trigger the inflation of the airbag contained therein.

The airbag extension system may be positioned based upon characteristics of the object which it is configured to protect. In this regard, the airbag package may be positioned such that, when the airbag is deployed it is within the protection range of the passenger, such as identified by the system. In addition, variations in occupant position and/or orientation away from the standard seating configuration may be accounted for by further translating and/or rotating the airbag package. Moreover, depending on the location where the object is projected to impact, the positioning of the airbag package may be adjusted. For instance, when the object is configured to hit the side of the vehicle, the airbag may be adjusted to protect the passenger from the side the vehicle is hit.

The features described herein may allow for standardized airbags to be used in vehicles having non-standard seating configurations. In this regard, the airbag extension system may reduce the distance the airbag must reach, thereby reducing the need for a larger airbag. As such, the amount of fluid required to inflate the airbag may be reduced thereby reducing the need for more than one inflator, large inflators, and/or custom inflators. Moreover, manufacturing costs for the airbag package may be reduced as the size of the airbag package is standardized. The use of an airbag extension system may also allow for unique placements of the airbag within the vehicle, while providing the ability to provide protection to passengers in areas of the vehicle not possible to protect with a standard airbag system. Moreover, the features described herein may provide for a system for moving seats in a vehicle such that they are adequately protected by the vehicle's airbag. Should a collision occur, a passenger may be less seriously injured because he or she experienced less acceleration due to the impact and/or was moved away from the area where more serious injury would have likely occurred. Medical bills may be less expensive as a result, and potential liability to vehicle owners may be reduced. In addition, seating system may also experience less acceleration from the collision and therefore may require fewer repairs or otherwise be more likely to be usable after the collision. Because of these features, more seating arrangements may be used in vehicles.

Example Systems

Figure 4A:
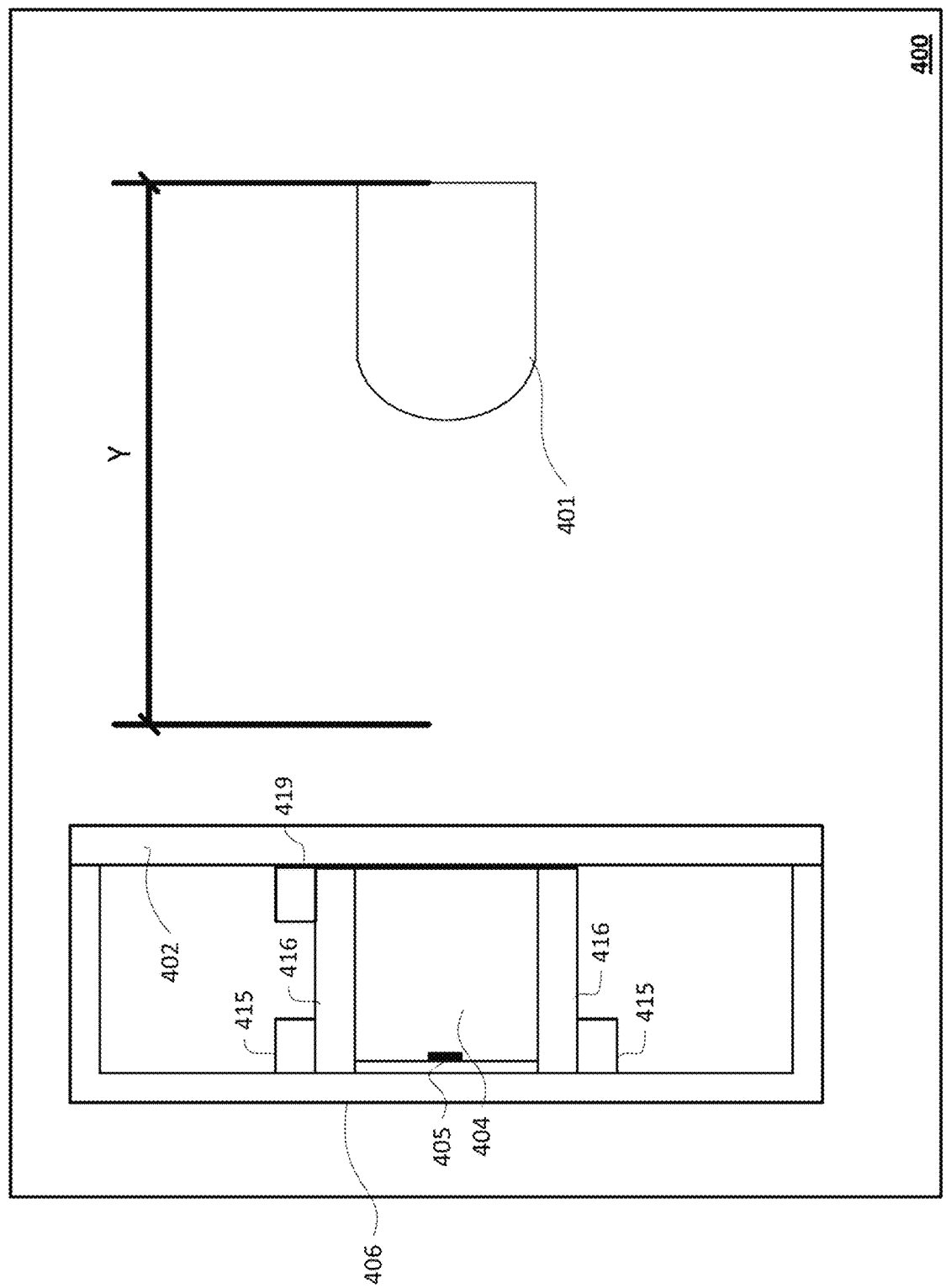
FIGS. 4A and 4B are views of a vehicle having an airbag extension system in accordance with aspects of the disclosure.
Figure 4B:
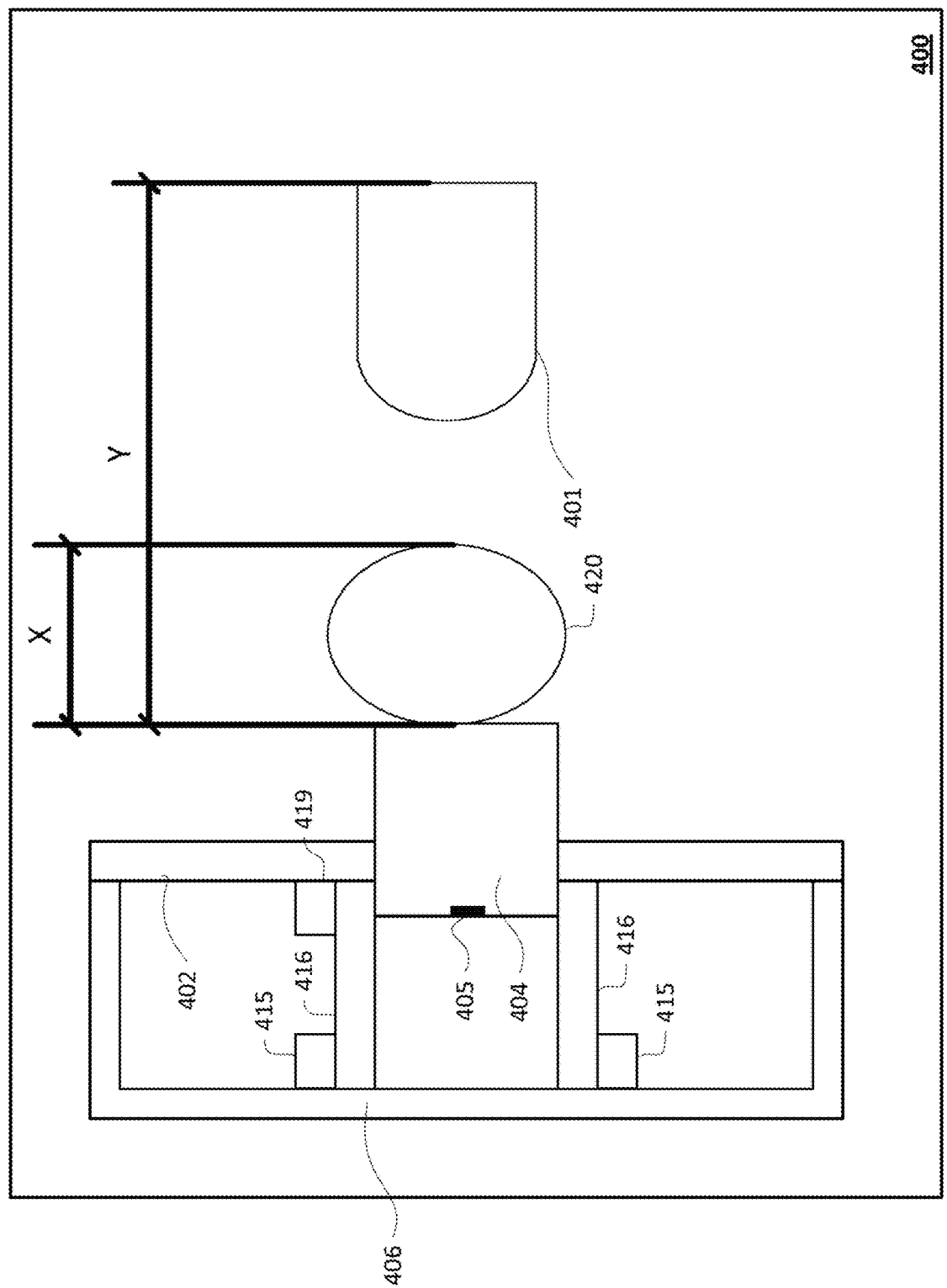

As shown in FIGS. 4A and 4B a vehicle 400 may include an airbag extension system for bringing an airbag within the protection range of a passenger. The airbag extension system may include mounts 415, a positioning unit 416, and an airbag package 404. The airbag package may include components such as airbag 420 having a standard size, an inflator 405, and other such components typically associated with airbag systems. In some instances, the airbag package 404 may include more than one of each or any of the components. Moreover, the inflator 405 may be located remotely from the airbag package, but connected to the airbag via a conduit, such as rubber or metal tubing.

The airbag extension system may be attached to the frame 406 of the vehicle 400 by the mounts 415. The mounts 415 may include one or more mounting brackets attached to the positioning unit and/or airbag package. For example, the mounts 415 of the airbag extension system are mounted to the frame 406 of the vehicle behind the dash 402 on the passenger side of the vehicle, as shown in FIGS. 4A and 4B. In some instances the mounts may be integrated into the positioning unit and/or airbag package, such as in the form of bolt or screw holes through which the airbag extension system may be attached to a portion of the vehicle. Mounting of the airbag extension system to the vehicle may be accomplished with fasteners such as bolts, screws, adhesives, etc., and/or other fastening methods such as welding, etc.

Although FIGS. 4A and 4B illustrate the airbag extension system as being mounted to the frame 406 of the vehicle behind the dash, the airbag extension system may be mounted anywhere sufficient support and room is present within the vehicle 400. For instance, the airbag extension system may be mounted within a steering column and/or steering wheel of the vehicle, to A, B, or C pillars of the vehicle, and or any other such portion of the vehicle. Moreover, the airbag extension system may be mounted in front of or behind panels of the interior of the vehicle, such as the dashboard, door panels, etc.

The location of the airbag extension system within the vehicle may be based upon the location of the passenger which the airbag extension system is configured to protect. For instance, FIGS. 4A and 4B illustrate an airbag extension system configured to protect a passenger situated in the front passenger side seat 401 of the vehicle 400. In this regard, upon deployment the airbag of the airbag extension system is positioned within the protection range of a passenger situated in the front passenger side seat 401 of the vehicle, as illustrated by distance "Y", shown in FIGS. 4A and 4B. Other airbag extension systems may be configured such that during deployment, the airbag is within at least a portion of the protection range "Y" of the passenger they are configured to protect. Protection range "Y" may be between 5 inches and 30 inches, or more or less, as measured from the seat back towards the direction of the airbag.

A positioning unit may be used to position the airbag package such that the airbag may be deployed at or near a location which is within the protection range of the passenger. In this regard, the positioning unit 416 may be any device capable of quickly moving the airbag package. For example, the positioning unit 416 may include one or more electromechanical linear actuators 419 which, when activated, guides the airbag package 404 to a location closer to the front passenger side seat 401, as shown in FIG. 4B. The closer location may correspond to a location where the passenger will be within the protection range of the airbag when deployed. In instances where the passenger is located too close for proper functioning of the airbag, the positioning unit may move the airbag package away from the passenger such that the protection range of the passenger, as illustrated by "Y" in FIG. 4B, is within the protection range "X" of the airbag when deployed. The protection range of the passenger and airbag may be predetermined such that the airbag extension system is configured to deploy the airbag within the protection range by default. In some instances, the protection range of the passenger and airbag may be determined based on the passenger's seating position and other characteristics as described herein.

Figure 5A:
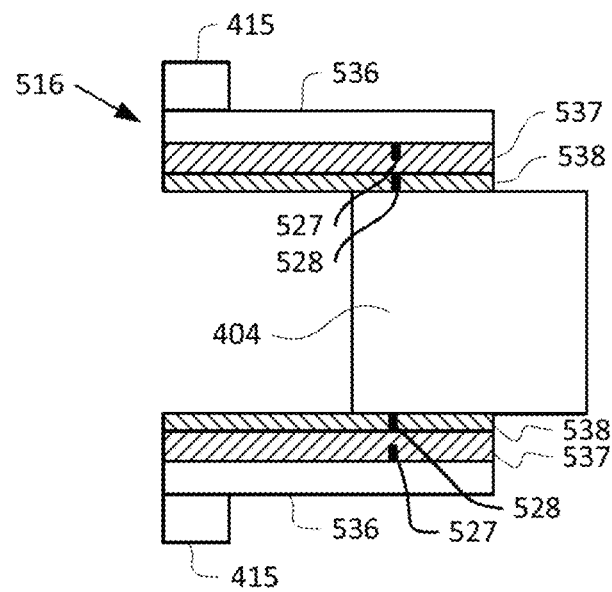
FIGS. 5A and 5B are examples of an airbag extension system having telescoping rails in accordance with aspects of the disclosure.
Figure 5B:
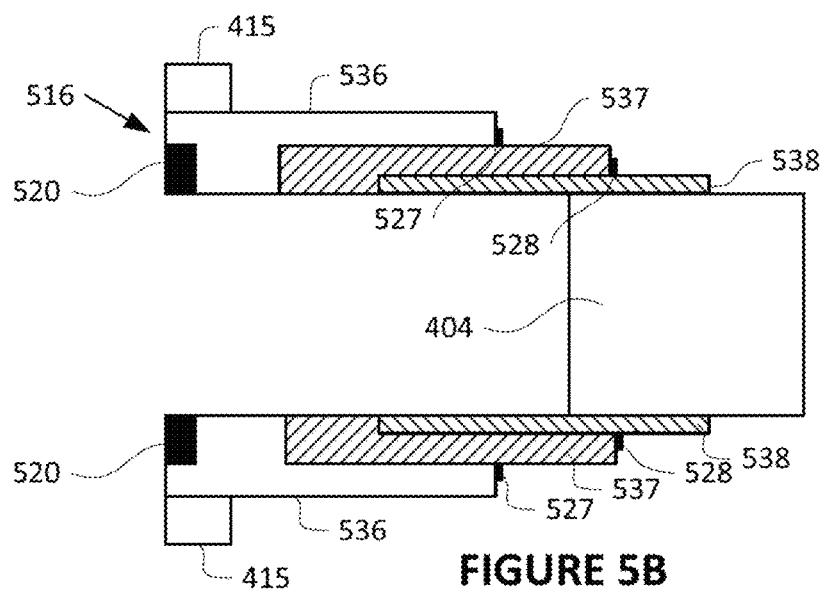

In some instances, the positioning unit may include telescoping rails. In this regard, each telescoping rail may be comprised of one or more stages, with each of the one or more stages being stored within a preceding stage. For example, the outermost stage 536 of the three stage telescoping rail configuration of the positioning unit 516, which may be compared to positioning unit 416, as illustrated in FIGS. 5A and 5B, may be stationary and attached to the mounts 415, which in turn mount to the vehicle as described herein. The second stage 537 may be positioned within the outermost stage 536 and third stage 538 may be positioned within the second stage 537. Upon deployment of the airbag extension system, the second stage 537 followed by the third stage 538 may be extended, thereby moving the airbag package 404 into position.

A deployment mechanism may deploy the stages of the telescoping rails. In this regard, the deployment mechanism could be one or more of actuators, springs, compressed fluid (e.g., a gas) etc. Referring again to FIG. 5B, the deployment mechanism 520 may be a compressed fluid contained within a canister. Upon being triggered, the deployment mechanism 520 may release the compressed fluid contained therein and force the stages of the telescoping rails to expand.

Upon completion of deployment, the deployment mechanism and/or the telescoping rails may be locked into place. By locking the deployment mechanism and/or the telescoping rails into place, recoil of the airbag package 404 back into its original position may be avoided. For instance, as further shown in FIGS. 5A and 5B, each moveable stage of the telescoping rails (i.e., the second stage 537 and the third stage 538), may include one or more expandable locks, such as expandable locks 527 corresponding to the second stage 537 and expandable locks 528 corresponding to the third stage 538. Each expandable lock may be configured to deploy out of the telescoping rails upon the respective stage being deployed. The expandable locks may prevent a deployed stage from returning back into the stage which surrounds it.

Figure 6B:
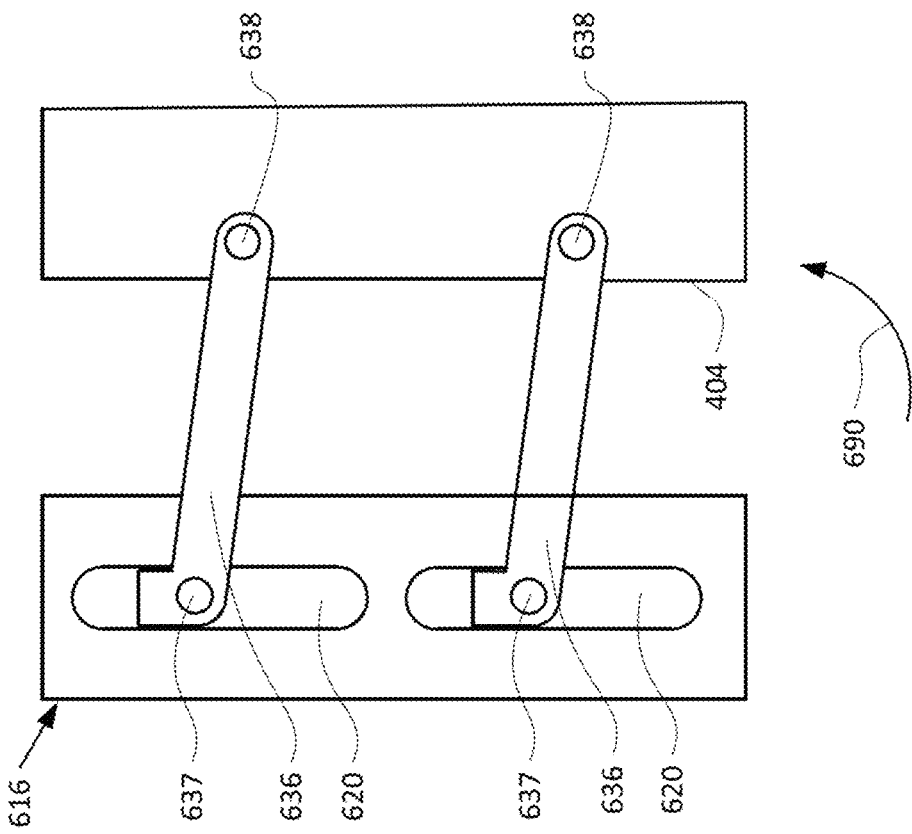
FIGS. 6A and 6B are examples of an airbag extension system having hinges in accordance with aspects of the disclosure.
Figure 6A:
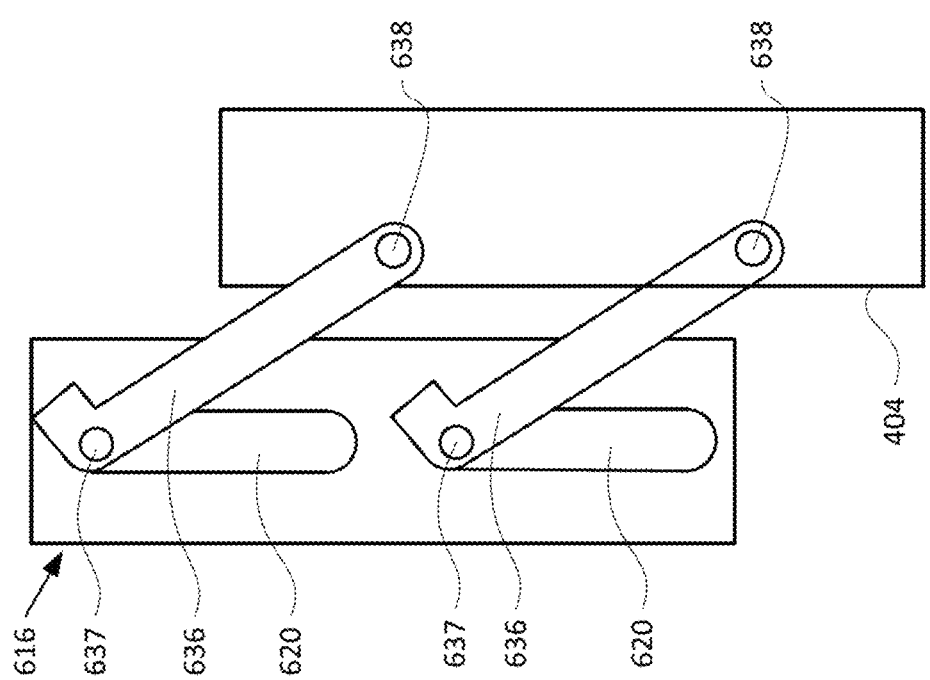

In another example, the positioning unit may include one or more springs and/or gas operated hinges. For example, as shown in FIGS. 6A and 6B, the airbag package 404 may be attached to the positioning unit 616, which may be compared to positioning units 416 and 516, by hinges. Upon the airbag extension system being deployed, the hinges 636 of the positioning unit 416, through the release of one or more springs, or through another power source, such as compressed liquid or an actuator, may be rotated in a first direction, as illustrated by arrow 690, from the closed position shown in FIG. 6A to an extended position shown in FIG. 6B. The rotation of the hinges 636 around pivot points 637 and 638 causes the airbag package 404 to move into position. In some instances, the hinges may travel within one or more columns, such as columns 620, to allow the airbag package 404 to be positioned at different locations. Movement of the hinges 636 within the columns 620 may be controlled by an actuator or other such device.

Figure 7B:
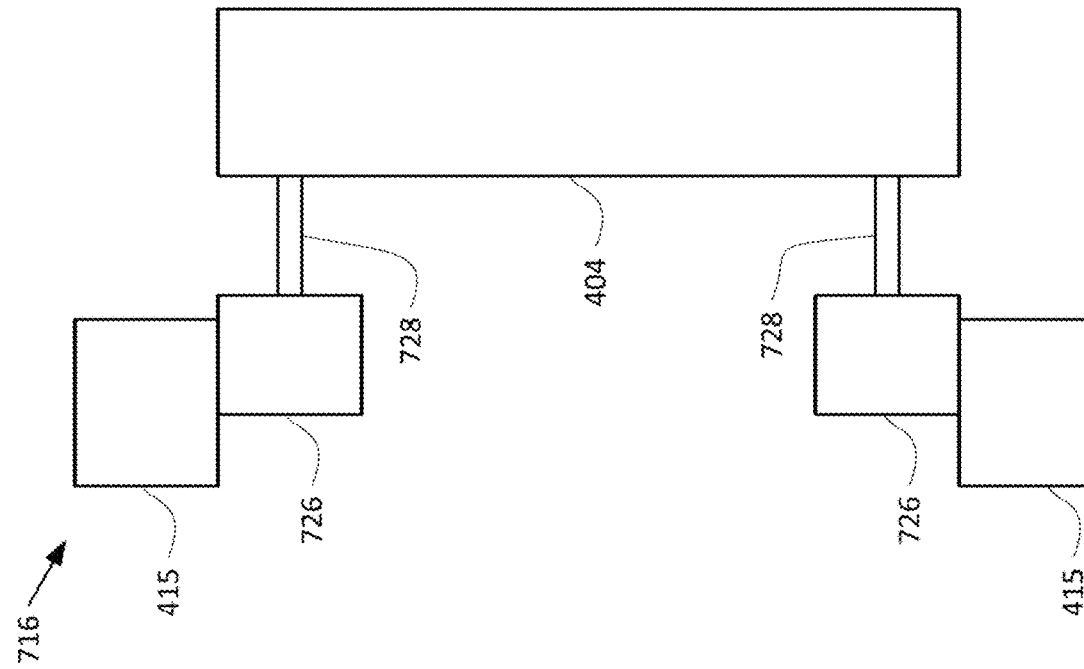
FIGS. 7A and 7B are examples of an airbag extension system having pyrotechnic lifters in accordance with aspects of the disclosure.
Figure 7A:
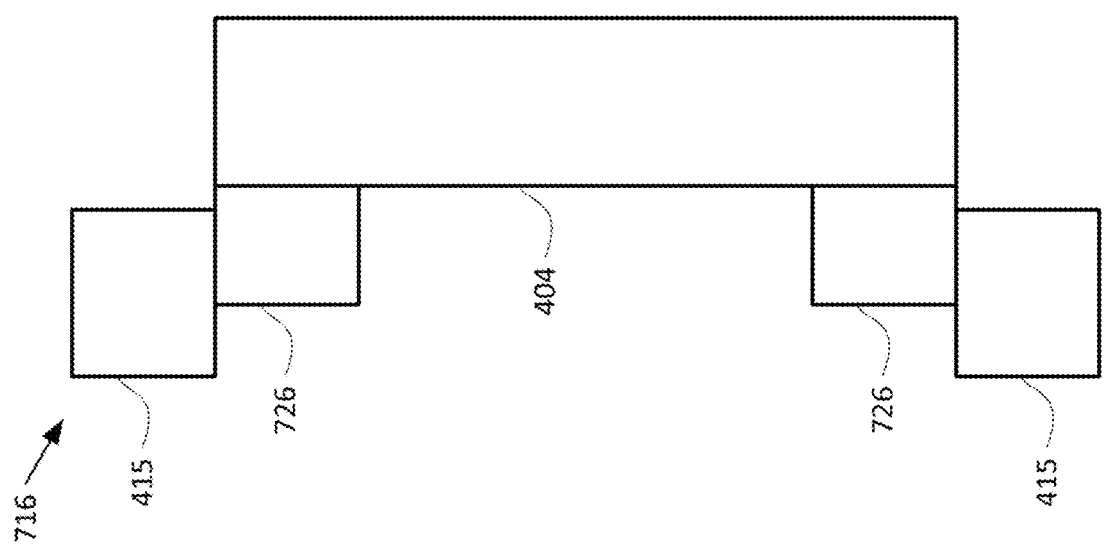

In another example, the positioning unit may include pyrotechnic lifters. For example, as shown in FIGS. 7A and 7B, the airbag package may be attached to the positioning unit 716, which may be compared to positioning units 416, 516, and 616. The positioning unit 716 may include pyrotechnic lifters 726, which in turn are attached to mounts 415. Upon the airbag extension system being deployed, the pyrotechnic lifters 726 may internally combust, thereby causing an extension rod 728 to extend out of the lifter forcing the airbag package 404 to move into position.

Although the positioning units are illustrated as causing translational movement of the airbag package in FIGS. 4A-7B, the positioning units may be curved such that the airbag package moves in a curved path when deployed. As such, the airbag package may be rotated as well as translated during deployment, thereby allowing innumerable mounting positions for the airbag extension system.

To allow the positioning unit to move the airbag package into position, the panel behind which the airbag package is positioned may be moved. In this regard, the panel behind which the airbag package 404 is positioned may include one or more sub panels, such as sub panels 806A-806C shown in the top and front perspectives of FIGS. 8A and 8B, respectively. At least one of the sub panels may be configured to open, such that the airbag package is free to move in front of the panel. In this regard, the sub panel behind which the airbag package is positioned may be held in a closed position by one or more fasteners, such as clasps, latches, push-pin rivets, or other such fasteners typically used to secure interior panels of an automobile together or to the frame of the vehicle. For instance, as further shown in FIG. 8A, sub panel 806B may be held in a closed position by fasteners 816.

Upon deploying the airbag extension system, the fasteners may be released, broken, or otherwise removed. As such, the sub panel held closed by the fasteners opens to provide a space for the airbag package to reposition. For instance, as shown in FIG. 8B, upon fasteners 816 being released, sub panel 806B may be opened, thereby allowing airbag package 404 to be repositioned.

Figure 9B:
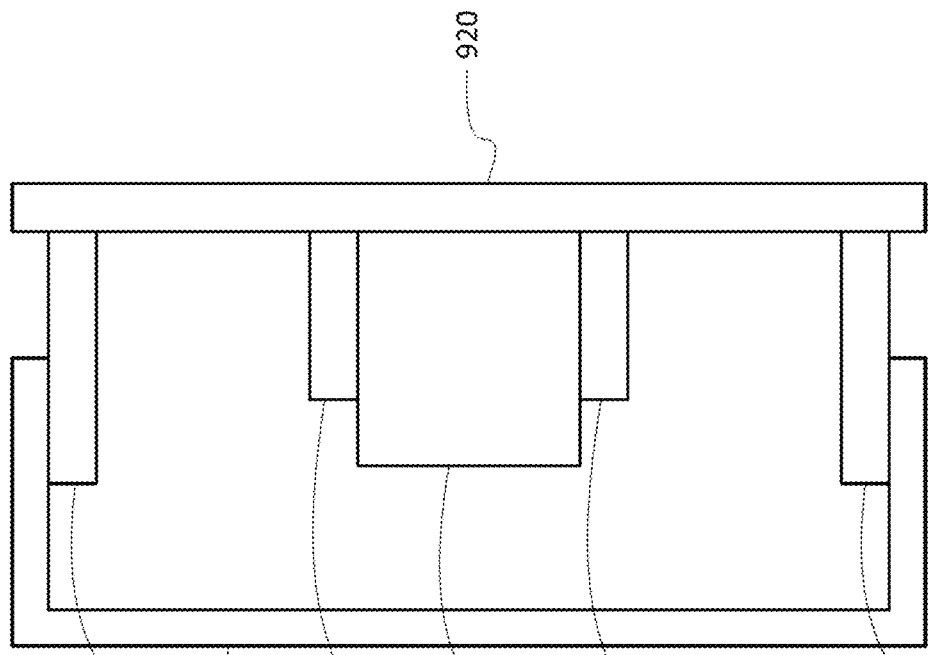
FIGS. 9A and 9B are examples of an airbag extension system mounted to a panel of a vehicle in accordance with aspects of the disclosure.
Figure 9A:
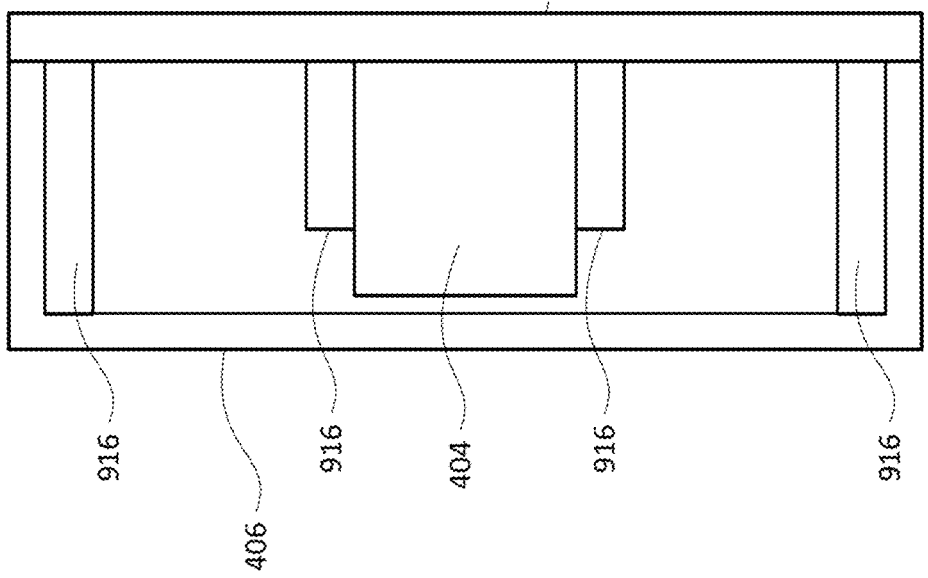

In some instances the airbag extension system may be integrated into a panel of the vehicle. For example, as shown in FIGS. 9A and 9B, the positioning unit 916, which may be compared to positioning units 416, 516, 616, and 716 may be attached to the panel 920 and frame 406. The airbag package 404 may be attached to the panel 920 via one or more mounting brackets 916, as further shown in FIGS. 9A and 9B. As such, the positioning unit may move the entire panel 920, along with the airbag package 404 into position, as shown in FIG. 9B. A sub panel or the entire panel 920 may be opened during or after positioning airbag package 404 to allow the airbag to deploy.

The airbags contained in the airbag package may be of a standardized size. In this regard, the driver side airbags may be configured to provide protection over a distance of up to twenty inches, or more or less, and a passenger side airbag may be configured to offer protection over a distance of up to 30 inches, or more or less.

Each of the airbags may include its own inflator which can be triggered by an electronic signal from one or more of the computing devices of the autonomous vehicle. For instance, referring again to FIG. 4B, airbag 420 of airbag package 404 may include its own inflator 405. This signal may trigger ignition of a fluid generator propellant to rapidly inflate the airbag. Moreover, each airbag may also have its own vent to control the flow of fluid out of the airbag after deployment and upon passenger impact to reduce the impact force on the passenger. In this regard, active venting, such as pyro-activated vents, or passive venting, such as holes, flaps or extra channels built into the airbag may be used to control the flow of fluid out of the airbag.

Figure 10:
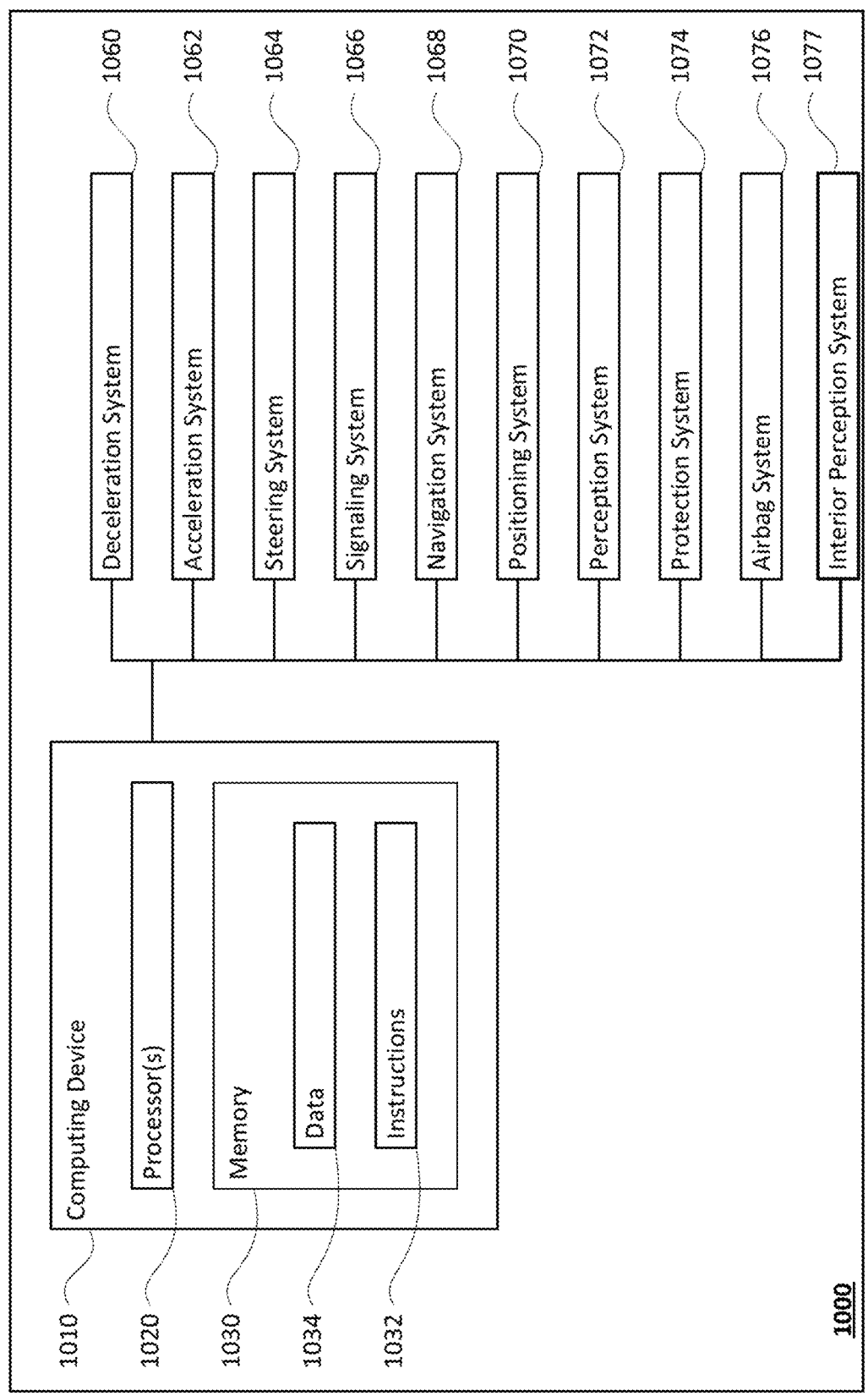
FIG. 10 is an illustration of a computing system in accordance with aspects of the disclosure.

The vehicle in which the airbag extension system is attached may have a highly sophisticated interior perception system including a plurality of sensors. For instance, as shown in FIG. 10, a vehicle 1000, which may be compared with vehicles 100, 300, and 400, is in accordance with one aspect of the disclosure and includes various components. While certain aspects of the disclosure are particularly useful in connection with specific types of vehicles, the vehicle may be any type of vehicle including, but not limited to, cars, trucks, motorcycles, busses, recreational vehicles, autonomous vehicles, etc. The vehicle 1000 may have one or more computing devices, such as computing device 1010 containing one or more processors 1020, memory 1030 and other components typically present in general purpose computing devices.

The memory 1030 stores information accessible by the one or more processors 1020, including instructions 1032 and data 1034 that may be executed or otherwise used by the processor 1020. The memory 1030 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 1032 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 1034 may be retrieved, stored or modified by processor 1020 in accordance with the instructions 1032. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 1020 may be any conventional processors, such as commercially available CPUs. Alternatively, the one or more processors may be a dedicated device such as an ASIC or other hardware-based processor. Although FIG. 10 functionally illustrates the processor, memory, and other elements of computing device 1010 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 1010. Accordingly, references to a processor or computing device will be understood to include references to a collection of processors or computing devices or memories that may or may not operate in parallel.

Computing device 1010 may include all of the components normally used in connection with a computing device such as the processor and memory described above as well as a user input (e.g., a mouse, keyboard, touch screen and/or microphone) and various electronic displays (e.g., a monitor having a screen or any other electrical device that is operable to display information (not shown)).

In one example, computing device 1010 may be an autonomous driving computing system incorporated into vehicle 1000. The autonomous driving computing system may capable of communicating with various components of the vehicle. For example, as further shown in FIG. 10, computing device 1010 may be in communication with various systems of vehicle 1000, such as deceleration system 1060, acceleration system 1062, steering system 1064, signaling system 1066, navigation system 1068, positioning system 1070, perception system 1072, interior perception system 1077, and protection system 1074 in order to control the movement, speed, etc. of vehicle 1000 in accordance with the instructions 1032 of memory 1030. Again, although these systems are shown as external to computing device 1010, in actuality, these systems may also be incorporated into computing device 1010, again as an autonomous driving computing system for controlling vehicle 1000. As with the computing device 1010, each of these systems may also include one or more processors as well as memory storing data and instructions as with processors 1020, memory 1030, data 1034 and instructions 1032.

As an example, computing device 1010 may interact with deceleration system 1060 and acceleration system 1062 in order to control the speed of the vehicle. Similarly, steering system 1064 may be used by the computing device 1010 in order to control the direction of vehicle 1000. For example, if vehicle 1000 is configured for use on a road, such as a car or truck, the steering system may include components to control the angle of wheels to turn the vehicle. Signaling system 1066 may be used by computing device 1010 in order to signal the vehicle's intent to other drivers or vehicles, for example, by lighting turn signals or brake lights when needed.

Navigation system 1068 may be used by computing device 1010 in order to determine and follow a route to a location. In this regard, the navigation system 1068 and/or data 1034 may store detailed map information, e.g., highly detailed maps identifying the shape and elevation of roadways, lane lines, intersections, crosswalks, speed limits, traffic signals, buildings, signs, real time traffic information, vegetation, or other such objects and information.

Positioning system 1070 may be used by computing device 1010 in order to determine the vehicle's relative or absolute position on a map or on the earth. For example, the position system 1070 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than the absolute geographical location.

The positioning system 1070 may also include other devices in communication with computing device 1010, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 1010, other computing devices and combinations of the foregoing.

Figure 11:
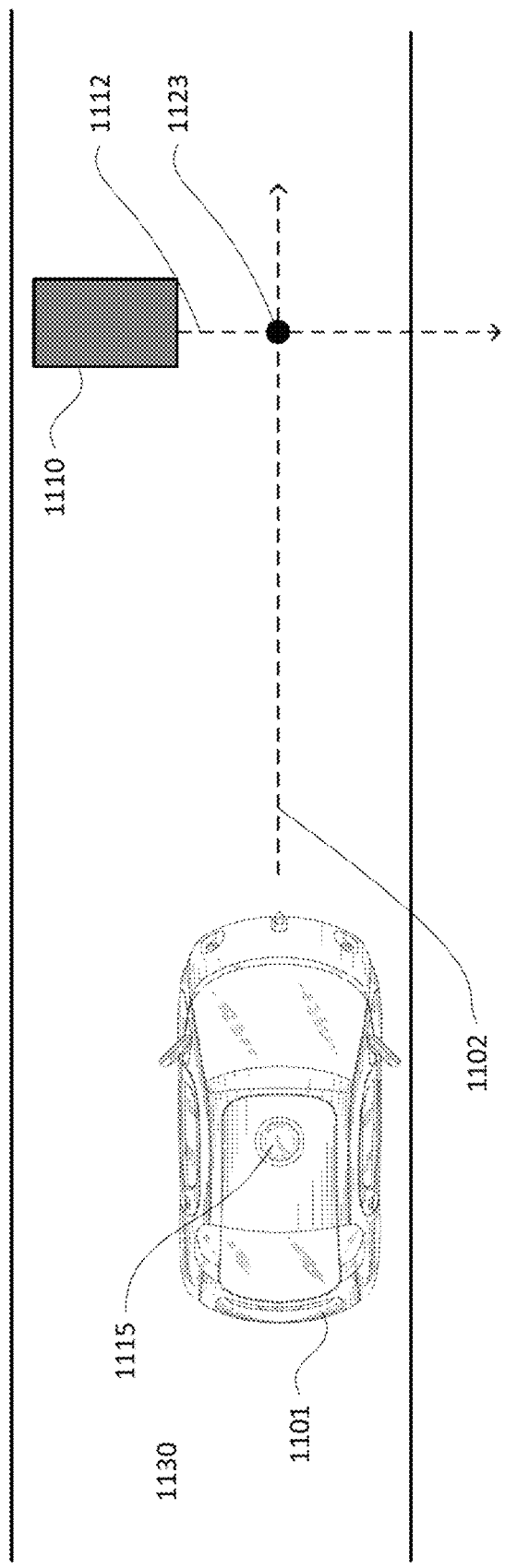
FIG. 11 is a top-down illustration of an unavoidable collision in accordance with aspects of the disclosure.

The perception system 1072 also includes one or more components for detecting objects external to the vehicle such as other vehicles, obstacles in the roadway, traffic signals, signs, trees, etc. For example, the perception system 1072 may include lasers, sonar, radar, cameras and/or any other detection devices that record data which may be processed by computing device 1010. In the case where the vehicle is a small passenger vehicle such as a car 1101, the car may include one or more lasers, such as laser 1115 as shown in FIG. 11, or other sensors mounted on the roof or other convenient location.

The computing device 1010 may control the direction and speed of the vehicle by controlling various components. By way of example, computing device 1010 may navigate the vehicle to a destination location completely autonomously using data from the detailed map information and navigation system 1068. Computing device 1010 may use the positioning system 1070 to determine the vehicle's location and perception system 1072 to detect and respond to objects when needed to reach the location safely. In order to do so, computing device 1010 may cause the vehicle to accelerate (e.g., by increasing fuel or other energy provided to the engine by acceleration system 1062), decelerate (e.g., by decreasing the fuel supplied to the engine, changing gears, and/or by applying brakes by deceleration system 1060), change direction (e.g., by turning the front or rear wheels of vehicle 1000 by steering system 1064), and signal such changes (e.g., by lighting turn signals of signaling system 1066). Thus, the acceleration system 1062 and deceleration system 1062 may be a part of a drivetrain that includes various components between an engine of the vehicle and the wheels of the vehicle. Again, by controlling these systems, computing device 1010 may also control the drivetrain of the vehicle in order to maneuver the vehicle autonomously.

These sensors of perception system 1072 may detect objects in the vehicle's environment as well as characteristics of those objects such as their location, heading, size (length, height, and width) type, and approximate center of gravity. For example, the perception system may use the height of an object identified as a pedestrian (or human) to estimate the approximate center of gravity of the object. In this regard, the perception system may compare the characteristics of the object to known anthropomorphic data to determine an approximate center of gravity. For other object types, the approximate center of gravity may be determined from the characteristics of the object using various known statistical analyses. Data and information required for these determinations may be stored, for example, in memory 1030 or a different memory of the perception system.

The interior perception system 1077 may include one or more components for detecting objects internal to the vehicle such as passengers. For example, the interior perception system 1077 may include lasers, sonar, radar, cameras and/or any other detection devices that record data which may be processed by computing device 1010. In the case where the vehicle is a small passenger vehicle such as a car 1101, the car may include one or more lasers or other sensors mounted on the dash, pillars, or other convenient locations.

The sensors of interior perception system 1077 may detect objects in the vehicle's interior environment as well as characteristics of those objects such as their location, size (length, height, and width) type, positioning, and approximate center of gravity. For example, the interior perception system may use the height and size of an object identified as a passenger to estimate a protection range of that passenger.

As discussed in more detail below, information from the perception system and interior perception system may be sent to various other systems in order to make decisions about when and how to deploy various safety mechanisms. In this regard, the perception system and interior perception may send the information to the vehicle's computing device which make such decisions and forward activation instructions to protection system 1074 which deploys one or more safety mechanisms 1076 in accordance with the activation instructions. In another example, the perception system 1072 and interior perception system 1077 may forward the information directly to the protection system 1074 which then determines whether and how to deploy one or more safety mechanisms 1076, such as the airbag extension system.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Computing devices within the vehicle may determine that an impact with an object cannot be avoided by way of braking, steering, and/or accelerating the vehicle. For instance, as shown in FIG. 11, the vehicle's sensor 1115 may detect an object 1110 moving along a first path 1112 towards the vehicle's projected path 1102 on road 1130. Upon determining impact with an object is imminent or has occurred, such as at point 1123, the computing device, such as the protection system 1074 may send a signal to the airbag system 1076 to trigger deployment of the airbag extension system. Upon positioning the airbag package, the airbag extension system may trigger the inflation of the airbag contained therein.

As discussed herein, the computing device may have a highly sophisticated interior perception system including a plurality of sensors. Data from the sensors may be received and processed by one or more computing devices of the vehicle's air bag control system in real time in order to detect and identify the characteristics (size, shape, location, object type, etc.) of objects within the vehicle's interior environment. For instance, the object may be determined to be a passenger with a small frame, such as a child.

The characteristics of the objects within the vehicle's interior may be used to determine the appropriate pressure and speed at which the airbag should be expanded. Continuing the above example, if the object is a child, the pressure of the airbag may be less, or more venting may be employed, such that the force of the child hitting the airbag is absorbed by the airbag. Moreover, depending upon the location and/or positioning of the passenger relative to the airbag extension system, the airbag can be inflated.

In some instances the positioning of the airbag extension system may be adjusted based on the characteristics of the object which it is configured to protect. For instance, if the object is a smaller (or shorter) passenger, the airbag extension system may be positioned closer to the passenger than if the passenger was larger (or taller) in size, although the location may be dependent upon the airbag design, inflation pressure, and venting. In instances when the airbag package is located such that its deployed airbag would be within the protection range of the passenger, the airbag may be deployed without the positioning unit of the airbag extension system repositioning the airbag package.

In some instances the positioning of the airbag extension system may be adjusted based on the characteristics of the object which it is projected to impact. For instance, if an object is projected to impact to the left of the passenger, the airbag may be positioned (e.g., rotated and/or translated) to the left of the passenger.

Figure 12:
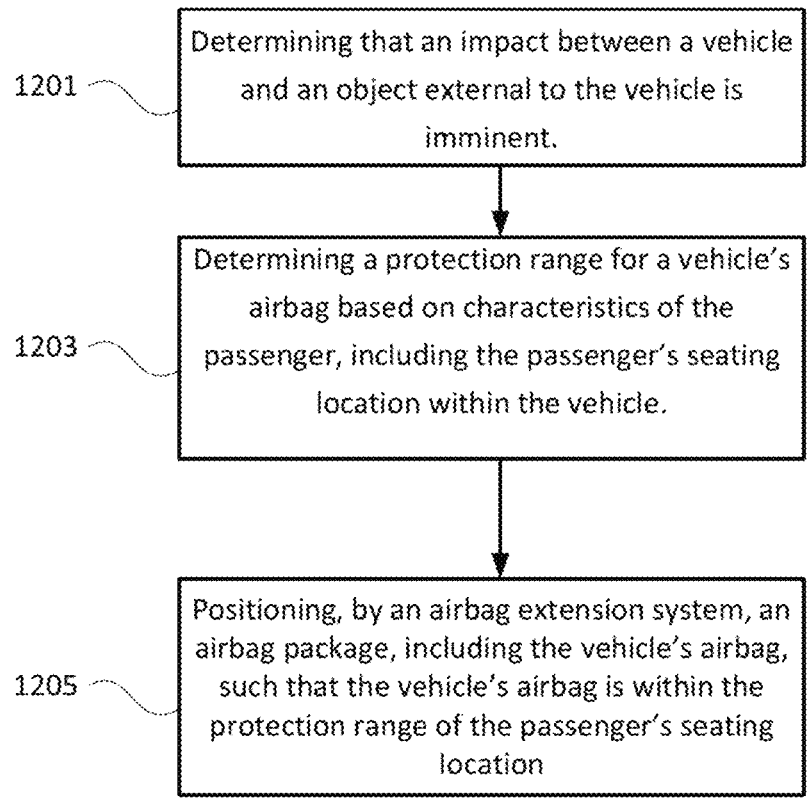
FIG. 12 is an example flow diagram in accordance with aspects of the disclosure.

FIG. 12 is an example flow diagram 1200 including a method for reducing likelihood of injury to a passenger in a collision, in accordance with some of the aspects described above. For example, at block 1201, a determination that an impact between a vehicle and an object external to the vehicle is imminent. At block 1203, a protection range for a vehicle's airbag based on characteristics of the passenger, including the passenger's seating location within the vehicle may be determined. At block 1205, the airbag extension system, an airbag package, including the vehicle's airbag, may be positioned such that the vehicle's airbag is within the protection range of the passenger's seating location.

In some instances, the passenger's seat may also be translated or rotated to position the passenger relative to the airbag. For instance, the passenger's seat may be further away from an airbag extension system than the airbag extension system can cover, as such, the seat may be rotated and/or translated closer to the airbag extension system. For instance, based on the determination that impact is imminent along a collision axis, a most favorable orientation of a seat in the vehicle may be determined. The most favorable orientation of the seat may be where there is a least likelihood of injury to the passenger in the seat and/or at which personal restraints perform best. In some examples, the most favorable orientation of the seat may be determined as an angle to the collision axis, such as parallel to the collision axis with the back of the seat between the location of impact and a passenger in the seat.

The seat may also include a positioning unit. As discussed, the seat of the vehicle may be rotated to the most favorable orientation to reduce the risks of serious injury to a passenger in the seat upon impact. The rotation of the seat may be performed by a positioning unit that is activated by the vehicle's one or more computing devices. The seat may be rotated along one or more of the vertical axis, longitudinal axis, or lateral axis in order to protect the passenger in the seat from the primary and potential secondary impacts.

In one example, the seat of the vehicle may be translated a distance away from, or towards the determined location of impact prior to impact to further reduce the risks of serious injury to the passenger. Simultaneously, the airbag extension system may be positioned to protect the updated location of the passenger. The translation of the seat may be performed by a positioning that is activated by the vehicle's one or more computing devices. The seat may also be translated away from other seats or objects in the vehicle to further reduce the risks of injury due to secondary impacts.

Although many of the examples described herein are related to the use of vehicles when operating in autonomous driving modes, such features may also be useful for vehicles operating in manual or semi-autonomous modes or for vehicles having only manual driving mode and semi-autonomous driving modes. In such cases, an active safety mechanism may be identified as discussed above. However, when making the determination as to whether to deploy the active safety mechanism and/or control the vehicle as discussed above, the reaction time of the driver may be compared with the estimated time at which an impact with an object is expected to occur. Reaction times may be determined, for example, by monitoring a specific driver's reaction times over time or by using average or expected reaction times for drivers in general. If the reaction time is too slow, the vehicle's computing device may then use the estimated time when an update will be received to determine whether to deploy the active safety mechanism and, in the case of a vehicle with such capabilities to take control and maneuver the vehicle as discussed in the examples above.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system for reducing a likelihood of injury to a passenger in a collision, the system comprising:
    a positioning unit including one or more telescoping rails; and
    an airbag package including one or more airbags and one or more inflators,
    wherein the airbag package is attached to the positioning unit,
    wherein the positioning unit is configured to extend to position the airbag package using the one or more telescoping rails such that the one or more airbags are within a protection range of the passenger upon the one or more airbags being deployed by the one or more inflators,
    wherein each of the one or more telescoping rails includes two or more stages, and
    wherein at least one of the one or more telescoping rails includes a lock for securing the at least one of the one or more telescoping rails upon positioning the airbag package within the protection range upon at least one of the two or more stages of the telescoping rails expanding.

2. The system of claim 1, wherein the protection range of the passenger is between 5 inches and 30 inches.

3. The system of claim 1, wherein the positioning unit is mounted to a frame of a vehicle.

4. The system of claim 1, wherein the positioning unit is configured to rotate and translate the airbag package.

5. The system of claim 1, wherein the positioning unit includes one or more linear actuators and the one or more linear actuators position the airbag package.

6. The system of claim 1, wherein the lock for securing the at least one of the one or more telescoping rails is an expandable lock.

7. The system of claim 1, wherein the one or more telescoping rails are configured to be extended by one or more of springs, actuators, or compressed gas.

8. The system of claim 1, wherein the positioning unit includes one or more hinges and the hinges are configured to rotate the airbag package into the protection range.

9. The system of claim 1, wherein the positioning unit includes one or more pyrotechnic lifters and the pyrotechnic lifters are configured to position the airbag package into the protection range.

10. The system of claim 9, wherein the pyrotechnic lifters include one or more extension rods connected to the airbag package.

11. The system of claim 1, wherein the airbag package is positioned behind a panel of a vehicle.

12. The system of claim 11, wherein upon initiating positioning of the airbag package, the panel of the vehicle is opened.

13. The system of claim 1, wherein the one or more inflators includes a gas generator propellant.

14. A method for reducing a likelihood of injury to a passenger in a collision, the method comprising:
    determining, by one or more computing devices, that an impact between a vehicle and an object external to the vehicle is imminent;
    determining, by the one or more computing devices, a protection range for a vehicle's airbag based on characteristics of the passenger, including a seating location of the passenger within the vehicle; and
    positioning, by a positioning unit of an airbag extension system, an airbag package, including the vehicle's airbag, such that the vehicle's airbag is within the protection range of the seating location of the passenger, the positioning unit having one or more telescoping rails.

15. The method of claim 14, wherein positioning the airbag package further includes using the one or more telescoping rails to move the vehicle's airbag within the protection range.

16. The method of claim 15, wherein the positioning unit further includes pyrotechnic lifters, hinges, and actuators.

17. The method of claim 14, wherein positioning the airbag package includes rotating and translationally moving the airbag package.

18. The method of claim 14, wherein the characteristics further include a size of the passenger.

19. The method of claim 14, wherein the one or more computing devices trigger the positioning.

* * * * *